Patented June 24, 1947

2,422,728

UNITED STATES PATENT OFFICE 2,422,728

REACTION OF BETA-LACTONE, ALCOHOL AND HYDROGEN HALIDE

Thomas L. Gresham and Forrest W. Shaver, Akron, Ohio, assignors to The B. F. Goodrich Company, New York, N. Y., a corporation of New York No Drawing. Application October 5, 1945, Serial No. 620,665

10 Claims. (Cl. 260—487)

This invention relates to the chemical reaction of a beta-lactone, an alcohol and a hydrogen halide, and pertains more specifically to the preparation of esters of beta-halo carboxylic acids, and esters of alpha-beta unsaturated carboxylic acids by this reaction.

It is disclosed in U. S. Patent 2,352,641 to Frederick E. Küng that beta-lactones, that is, lactones or inner esters of beta-hydroxy carboxylic acids, such as beta-propiolactone (also called hydracrylic acid lactone) will react with alcohols such as ethyl alcohol to produce beta-alkoxy carboxylic acids.

We have now discovered that the reaction of beta-lactones with alcohols takes an entirely different course when a hydrogen halide is also present. In this event, an ester of a beta-halo carboxylic acid, rather than a beta-alkoxy carboxylic acid, is formed in accordance with the following equation:

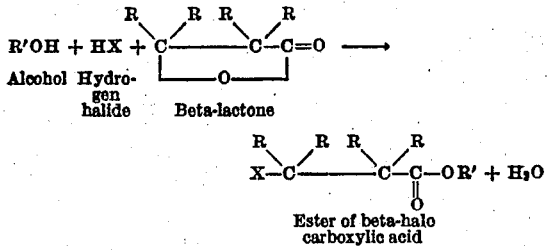

where R' is an alcohol radical; X is a halogen atom such as chlorine, bromine, or iodine, preferably chlorine, and R is hydrogen or a substituent group.

When the ester formed contains a plurality of halogen atoms, as when a polyhydric alcohol or a halogenated alcohol is used, it is often unstable and loses one or more molecules of hydrogen halide when heated, with the result that an unsaturated ester is produced.

In carrying out the reaction no critical conditions are necessary and a variety of procedures may be employed. A preferred procedure consists in dissolving the beta-lactone in a molecular excess of the alcohol (if the latter is a liquid as is ordinarily the case), adding hydrogen halide to the solution in molecular excess over the beta-lactone preferably by saturating the solution with a stream of gaseous hydrogen halide for about 1 to 10 hours while the solution is cooled below room temperature, say to about 0 to 20° C.; refluxing the solution to complete the reaction, and then distilling the reaction product. Catalysts for the reaction, which are preferably but not necessarily present, include the halides of metals such as zinc chloride, aluminum chloride, ferric chloride, aluminum bromide, etc.

Other procedures by which the alcohol, the beta-lactone and the hydrogen halide are brought into reactive contact with one another may also be used. For example, the hydrogen halide may be added, either in the gaseous form or in water solution as the halogen acid, to the alcohol; the beta-lactone added and the solution refluxed and distilled, or the hydrogen halide may be added to a solution of the beta-lactone in the alcohol, and the product then isolated without first refluxing the solution. Solvents for all of the reactants may be present but are generally employed only when the alcohol is a solid and will not itself dissolve the other reactants.

The practice of the invention may be illustrated by the following specific examples of the production of typical esters of beta-halo propionic acids from an alcohol, a hydrogen halide and beta-propiolactone.

Example 1

60 ml. of absolute ethanol is saturated with anhydrous hydrogen chloride and the solution brought to reflux temperature. While refluxing the solution and while hydrogen chloride is continuously introduced into the solution, a solution of 72 grams of beta-propiolactone in 50 ml. of ethanol are slowly added, the addition requiring about five hours. The reaction mixture is allowed to stand overnight and is then distilled under reduced pressure. A fraction boiling at 79.5 to 83.5° C./38 mm., and identified as ethyl beta-chloropropionate, is obtained in about 50% yield.

Example 2

A solution consisting of 72 grams of beta-propiolactone and 2 g. of ferric chloride dissolved in 200 ml. of commercial ethanol is prepared. This solution is cooled to 0° C., and while maintaining the temperature at about 0-10° C., hydrogen chloride is introduced for about 5 hours. The reaction mixture is allowed to warm to room temperature; saturated with HCl and allowed to stand overnight. It is then poured into a large volume of ice water and the oil which separates is extracted with ether and the ethereal solution dried over sodium sulfate. The ether is removed leaving a residue which is redistilled to produce 68.3 grams (52.1%) of substantially pure ethyl beta-chloropropionate.

Example 3

72 grams of beta-propiolactone are added to 300 ml. of a solution of hydrogen chloride in ethanol at a temperature of 2–10° C. Hydrogen chloride is also passed into the solution during the addition to keep the solution saturated with HCl. The reaction mixture is refluxed for about 6 hours and then distilled. 86.3 g. (63.2%) of ethyl beta-chloropropionate are thus obtained.

Examples 4 and 5

The procedure of Example 3 is repeated except that n-butanol is employed in place of ethanol. N-butyl beta-chloropropionate (B. P. 76.8–77.8/6mm.; $N_D^{20}=1.4312$) is obtained in 79% yield. Substantially the same yield is obtained in another example when the temperature of the solution during the addition of beta-propiolactone is 25 to 30° C.

Examples 6 to 8

The procedure of Example 3 is again three times repeated using methanol, n-propanol and 2-ethyl hexanol, respectively, in place of ethanol. Good yields of methyl beta-chloro propionate (B. P. 72.5–74° C./50 mm.); n-propyl beta-chloropropionate (B. P. 76.8–78.5/12 mm.; $N_D^{20}=1.4281$) and 2-ethylhexyl beta-chloropropionate (B. P. 120–123° C./4 mm.; $N_D^{20}=1.4430$), respectively, are obtained.

Example 9

72 grams of beta-propiolacetone are dissolved in 300 ml. of commercial ethanol and hydrogen bromide is added to the solution for five hours at a temperature of about 2–5° C. The reaction mixture is then distilled under reduced pressure whereupon a fraction consisting of 125.6 g. (69.4%) of ethyl beta-bromopropionate (B. P. 105.5–108.5° C./55 mm.) is obtained.

In the above examples the alcohol employed is an alkyl alcohol and the products obtained are alkyl esters of beta-halo propionic acids. Such esters are easily converted to alkyl acrylates by treatment with alkali metal hydroxides as is disclosed in U. S. Patent 1,864,884 to Bauer, or by treatment with strong acids as is disclosed in U. S. Patent 1,945,613 to Jacobi et al. Such treatments may be applied directly to the reaction mixture, without isolating the ester and the mixture then distilled to yield the corresponding alkyl acrylate. This invention thus provides a convenient and economical route to the highly useful alkyl acrylates. In addition to the alkyl alcohols specifically used in the examples any other such alcohol including isopropyl alcohol, tert-butyl alcohol, the various amyl, hexyl, heptyl, octyl, decyl, and dodecyl alcohols and the like may also be employed to yield other alkyl beta-halo propionates.

However, the invention is not confined to the preparation of alkyl beta-halo propionates, but rather other embodiments are embraced within its generic scope. Monohydric alcohols other than alkyl alcohols which may be used include allyl alcohol and other unsaturated aliphatic monohydric alcohols; cyclohexanol and other alicyclic monohydric alcohols; benzyl alcohol and other aromatic alcohols; furfuryl alcohol, tetrahydrofurfuryl alcohol, diethylene glycol monoethyl ether (Carbitol), beta-ethoxy ethanol (Cellosolve) or a similar monohydric alcohol composed of carbon, hydrogen and oxygen and having all its hydrogen attached to carbon except for the hydrogen of the alcoholic hydroxyl group. When such alcohols are reacted with beta-propiolactone and hydrogen chloride, for example, the corresponding esters of beta-chloropropionic acid are obtained.

Polyhydric alcohols such as ethylene glycol, diethylene glycol, glycerol and the like may also be reacted with beta-lactones and hydrogen halides according to this invention. For example, when ethylene glycol, beta-propiolactone and hydrogen chloride are used, the product first formed is ethylene glycol di-beta-chloropropionate which, however, is unstable and may be dehydrochlorinated by distillation or by other methods to liberate hydrogen chloride and thus produce ethylene glycol diacrylate.

Similarly, when an alcohol containing halogen substituted for hydrogen such ethylene chlorohydrin, glycerol alpha-chlorohydrin, trimethylene chlorohydrin, trimethylene bromohydrin, alpha-beta glycerol dichlorohydrin, alpha-gamma glycerol dichlorohydrin or the like is used, the first formed product, an ester of a beta-halo acid with a halo-alcohol, is often dehydrohalogenated on heating with the result that an unsaturated ester is produced.

The practice of the invention utilizing a halo-alcohol is illustrated in the following examples.

Example 10

A solution is prepared by dissolving 144 grams of beta-propiolactone in 235 cc. of ethylene chlorohydrin. While maintaining the solution at a temperature of 0–10° C., hydrogen chloride is then bubbled into the solution for about 8 hours. The reaction product is then poured into ice water, the heavy oil which separates is extracted with ether, dried and vacuum distilled. In this manner a 50% yield of beta-chloroethyl beta-chloropropionate (B. P. 76–81° C./3 mm.) is obtained.

Example 11

72 grams of beta-propiolactone dissolved in 40 cc. of ethylene chlorohydrin are added to 140 cc. of ethylene chlorohydrin while the latter is being heated to reflux temperature. Hydrogen chloride is then bubbled into the refluxing solution (temperature of 100–120° C.) for a period of 6 hours. The reaction mixture is washed with water to remove excess hydrogen chloride and is then distilled under reduced pressure, decomposition occurring with liberation of hydrogen chloride. Upon redistillation, a fraction consisting of a 30% yield of 2-chloroethyl acrylate (B. P. 39–43° C./3 mm.) together with some higher boiling material is obtained.

The 2-chloroethyl acrylate produced in this example probably results from the dehydrochlorination at the higher temperature of 2-chloroethyl 2-betachloropropionate first formed. By more vigorous dehydrochlorinating conditions such as distilling the reaction product with decomposition at higher pressure, two molecules of hydrogen chloride may be liberated and vinyl acrylate thus obtained.

Example 12

A solution of 144 grams of beta-propiolactone in 300 cc. of alpha-gamma glycerol dichlorohydrin (1,3-dichloroisopropanol) is cooled to 10–15° C. and, while maintaining this temperature gaseous hydrogen chloride is passed into the solution for about 8 hours. The reaction mixture is then poured into ice water, the oily layer separated, washed with water to remove excess HCl and dried. The product is then distilled at reduced pressure. A forerun of excess dichlorohydrin is obtained, and on further distillation 160 g. of a product boiling at 100–110° C./3 mm. results. This product polymerizes readily in the presence of peroxide catalysts to form a hard polymer and is believed to consist of chloroisopropenyl acrylate produced by the following reactions:

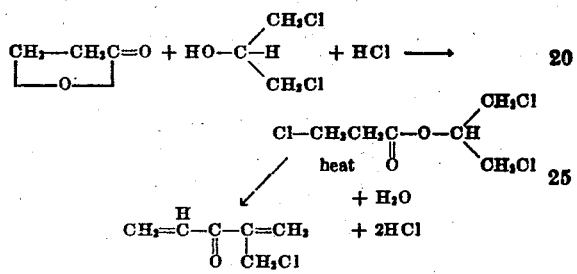

In addition to the alcohols mentioned hereinabove other alcohols may also be reacted with a beta-lactone and a hydrogen halide in accordance with this invention. Thus, nitro-substituted alcohols such as 2-nitro ethanol and the like may be used. Preferably the alcohol is one in which all hydrogen atoms except those attached to carbon are present in alcoholic hydroxyl groups, but alcohols containing hydrogen in substituent groups such as lactic acid (which is a carboxy-substituted alcohol) and the like, methylol urea, beta-mercapto ethanol and the like are also operable.

Beta-propiolactone, the simplest possible beta-lactone, is the preferred beta-lactone for use in this invention because of its low cost and the particular value of the products obtained. However, the use of beta-isobutyrolactone, one of the homologs of beta-propiolactone, is also advantageous since the reaction then leads to esters of beta-halo-iso-butyric acid, which yield methacrylates on dehydrohalogenation. Other homologs of beta-propiolactone, that is, other beta-lactones of saturated aliphatic monocarboxylic acids, such as beta-n-butyrolactone, beta-valerolactone, beta - iso-valerolactone, beta-n-caprolactone, alpha - ethyl - beta-propiolactone, alpha-isopropyl-beta-propiolactone, alpha-butyl-beta-propiolactone, alpha-methyl-beta - butyrolactone, alpha-ethyl-beta-butyrolactone, beta-methyl-beta-valerolactone and the like, however, may also be used as may still other beta-lactones. Other known beta-lactones include lactones of beta-hydroxy-monocarboxylic acids containing cycloalkyl, aryl and aralkyl substituents such as beta-cyclohexyl-beta-propiolactone, beta-phenyl-beta-propiolactone, alpha-phenyl-beta - propiolactone, beta-benzyl-beta-propiolactone and the like, all of which, like beta-propiolactone and its homologs, are of the general structure

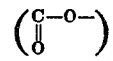

wherein R is hydrogen or an unreactive hydrocarbon group (i. e., a hydrocarbon group free from aliphatic unsaturation) and may be prepared in the manner described in U. S. Patent 2,356,459 to Frederick E. Küng. Still other known beta-lactones include lactones of unsaturated beta-hydroxy carboxylic acids, mono-beta lactones of dicarboxylic acids and dilactones of dicarboxylic acids in which at least one of the lactones is beta, examples of which are alpha,alpha-dimethyl-beta - propiolactone - beta - carboxylic acid; trimethyl-beta-propiolactone - beta - carboxylic acid; beta,beta-dimethyl-beta-propiolactone-alpha-carboxylic acid; trimethyl-beta-propiolactone-alpha-carboxylic acid and the beta-delta-dilactone of citrylidene malonic acid, all of which like the beta-lactones before mentioned are composed exclusively of hydrogen, carbon and carbonoxy

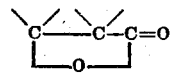

oxygen atoms. In addition to these compounds other compounds containing the structure

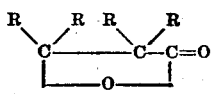

but having the valences on the alpha and beta carbons attached to groups containing elements other than or in addition to carbon and hydrogen such as oxygen, nitrogen, sulfur and halogen, whether in essentially unreactive structure such as nitro groups and ether linkages or in radicals containing reactive hydrogen such as amino and hydroxy, are also beta-lactones and hence are included within the generic class of beta-lactones. Examples of such latter compounds are alpha or beta-nitrophenyl-beta-propiolactone; beta (o-nitro - m - chlorophenyl) - beta - propiolactone; beta-(o-nitro-m-methoxyphenyl) - beta - propiolactone; alpha - hydroxy - beta - phenyl - beta-propiolactone and alpha-bromo-beta,beta-dimethyl - beta - propiolactone - alpha -carboxylic acid. In short, any of the generic class of beta-lactones may be usd in the practice of this invention.

Numerous other modifications and variations in the invention as herein described will be apparent to those skilled in the art and are within the spirit and scope of the appended claims.

We claim:

1. The method which comprises bringing into reactive contact with one another in the liquid phase, a beta-lactone, an alcohol and an acid consisting of a hydrogen halide, whereupon reaction occurs to form a beta-halo carboxylic acid ester.

2. The method which comprises forming a solution of a saturated aliphatic beta-lactone in a molecular excess of an alcohol which is liquid under normal conditions and bringing an acid consisting of a hydrogen halide into reactive contact with the said alcohol at a temperature at which the said alcohol is liquid, whereupon reaction occurs to form a beta-halo carboxylic acid ester.

3. The method which comprises forming a solution of beta-propiolactone in a molecular excess of a monohydric alcohol which is liquid under normal conditions and bringing a molecular excess of an acid consisting of a hydrogen halide into reactive contact with the said alcohol at a temperature at which the said alcohol is liquid, whereupon reaction occurs to form a beta-halo propionic acid ester.

4. The method of preparing an alkyl ester of a beta-halo propionic acid which comprises bringing a molecular excess of acid consisting of hydrogen halide into reactive contact with a solution containing a molecular equivalent of beta-propiolactone dissolved in a molecular excess of an alkyl alcohol which is liquid under normal conditions, at a temperature at which the said alcohol is liquid, whereupon reaction occurs to form an alkyl ester of a beta-halo propionic acid and separating the ester thus formed.

5. The method of claim 4 wherein the hydrogen halide is hydrogen chloride and the alcohol is ethanol, the ester formed being ethyl beta-chloro propionate.

6. The method of claim 4 wherein the hydrogen halide is hydrogen chloride and the alcohol is n-butanol, the ester formed being n-butyl beta-chloro propionate.

7. The method of preparing alkyl esters of beta-chloro propionic acid which comprises dissolving beta-propiolactone in a molecular excess of a liquid alkyl alcohol, adding a molecular excess acid consisting of gaseous hydrogen chloride to the solution at a temperature of 0 to 20° C., and separating the alkyl ester of beta-chloro propionic acid thus formed.

8. The method of preparing ethyl beta-chloro propionate which comprises forming a solution of beta-propiolactone in a molecular excess of ethanol, saturating the solution with gaseous hydrogen chloride at a temperature of about 0 to 20° C., refluxing the solution and then distilling the solution to yield ethyl beta-chloro propionate.

9. The method which comprises bringing into reactive contact with one another in the liquid phase, beta-propiolactone, a halogen containing aliphatic alcohol and a hydrogen halide, whereupon reaction occurs to form an ester of beta-chloro propionic acid with the halo alcohol, and then distilling the reaction product, whereupon dehydrohalogenation of the said ester occurs to produce an acrylic acid ester.

10. The method of claim 9 wherein the alcohol is ethylene chlorohydrin and the hydrogen halide is hydrogen chloride.

THOMAS L. GRESHAM.
FORREST W. SHAVER.

REFERENCES CITED

The following references are of record in the file of this patent:

UNITED STATES PATENTS

| Number | Name | Date |
| --- | --- | --- |
| 2,376,704 | Kung | May 22, 1945 |
| 2,352,641 | Kung | July 4, 1944 |
| 1,851,040 | Fikentscher et al. | Mar. 29, 1932 |

OTHER REFERENCES

Beilstein, Hand. der Organ. Chem., vol. 2 (2nd suppl.), p. 227, 4th ed.

Certificate of Correction

Patent No. 2,422,728. June 24, 1947.

THOMAS L. GRESHAM ET AL.

It is hereby certified that errors appear in the printed specification of the above numbered patent requiring correction as follows: Column 3, line 43, for "beta-propiolacetone" read *beta-propiolactone*; column 4, line 10, for "hyldroxyl" read *hydroxyl*; line 27, after "such" insert *as*; and that the said Letters Patent should be read with these corrections therein that the same may conform to the record of the case in the Patent Office.

Signed and sealed this 28th day of October, A. D. 1947.

[SEAL]

THOMAS F. MURPHY,
*Assistant Commissioner of Patents.*